United States Patent [19]
Goodell

[11] Patent Number: 5,286,283
[45] Date of Patent: Feb. 15, 1994

[54] AIR DRYER FOR COMPRESSED AIR SYSTEM HAVING A SERVICEABLE OIL FILTER

[75] Inventor: David J. Goodell, Lorain, Ohio

[73] Assignee: AlliedSignal Inc., Morristown, N.J.

[21] Appl. No.: 63,197

[22] Filed: May 17, 1993

[51] Int. Cl.⁵ .............................................. B01D 53/04
[52] U.S. Cl. ..................................... 96/113; 55/218; 96/135; 96/138; 96/147
[58] Field of Search ............... 55/218; 96/113, 114, 96/115, 134, 135, 138, 147

[56] References Cited

U.S. PATENT DOCUMENTS

| | | |
|---|---|---|
| 3,891,417 | 6/1975 | Wade . |
| 4,131,442 | 12/1978 | Frantz . |
| 4,336,043 | 6/1982 | Aonuma et al. ............. 55/218 X |
| 4,487,617 | 12/1984 | Dienes et al. . |
| 4,673,419 | 6/1987 | Kojima . |
| 4,713,094 | 12/1987 | Yanagawa et al. . |
| 4,892,569 | 1/1990 | Kojima . |
| 4,957,516 | 8/1990 | Daniels . |
| 5,002,593 | 3/1991 | Ichishita et al. . |
| 5,066,317 | 11/1991 | Gross et al. . |
| 5,110,327 | 5/1992 | Smith ........................... 96/134 |

Primary Examiner—Charles Hart
Attorney, Agent, or Firm—Ken C. Decker; William N. Antonis

[57] ABSTRACT

Air dryer for a compressed air system includes a desiccant canister and a tubular oil filter received within a cavity within the canister circumscribed by a desiccant bed. A tubular oil filter is mounted on a removable module so that the module and the oil filter may be removed from the air dryer without disturbing the desiccant canister. Accordingly, the oil filter is replaced at more frequent intervals than is the desiccant. During purging, purge air is bypassed around the oil filter directly to the exhaust port through a check valve permitting communication through a bypass passage only during purging.

18 Claims, 1 Drawing Sheet

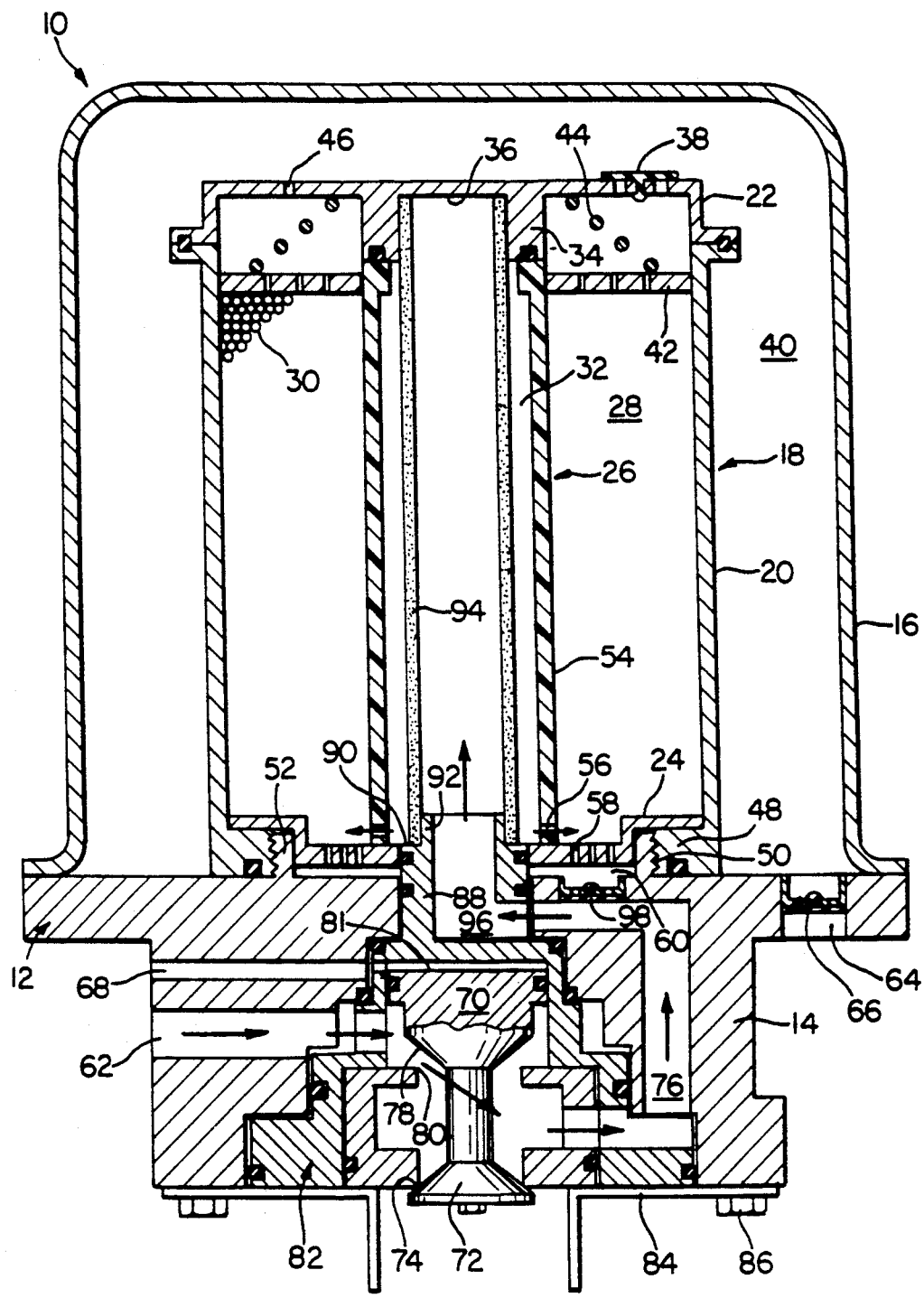

AIR DRYER FOR COMPRESSED AIR SYSTEM HAVING A SERVICEABLE OIL FILTER

This invention relates to an air dryer for a compressed air system, such as a compressed air braking system for heavy vehicles.

Heavy duty vehicles are equipped with a compressed air braking system in which the brakes of the vehicle are actuated by compressed air generated by an air compressor operated by the vehicle engine. Because moisture and oil entrained in the compressed air adversely affect brake system operation, it has become customary to install an air dryer in the system to remove moisture and oil entrained in the compressed air supply. These air dryers normally include a desiccant canister in which a desiccant material is provided to remove moisture from the compressed air and a separate oil filter, which removes oil. The desiccant is purged of its moisture content when the compressor goes off load by back flowing a small portion of the compressed air (which is kept in a segregated purge volume) through the desiccant material.

After the desiccant has been used for a period of time it must be replaced. Although many factors affect desiccant life, one primary factor is oil contamination of the desiccant. Existing oil filters used in air dryers remove only a portion of the oil entrained in the compressed air supply, and these oil filters are normally not serviced except when the desiccant is replaced, primarily because the filter cannot be serviced unless the desiccant canister is removed from the air dryer. However, tests have demonstrated that the life of the desiccant can be substantially increased if an increased proportion of entrained oil is removed from the compressed air. Accordingly, the present invention utilizes the highly evolved, commercially available tube-type oil filter which has proven to be extremely effective in removing oil entrained in compressed air. Furthermore, the oil filter is mounted on a removable module that is removable from the air dryer to enable replacement of the oil filter without removing the desiccant cartridge, thus enabling servicing of the oil filter, at intervals much more frequent than the desiccant is replaced. Accordingly, desiccant life is improved, and better oil filtration may permit a reduced volume of desiccant and/or a smaller purge volume required for the same service life and performance.

These and other features of the present invention will become apparent from the following specification, with reference to the accompanying drawing, the sole Figure of which is a cross-sectional view of an air dryer made pursuant to the teachings of the present invention.

Referring now to the drawing, an air dryer generally indicated by the numeral 10 includes a housing generally indicated by the numeral 12 comprising a base 14 and a cover 16 secured to the base 14. The cover 16 is removable to permit replacement of a desiccant canister generally indicated by the numeral 18. The desiccant canister 18 includes a circumferentially extending wall 20, an end wall 22, and another end wall 24 molded integrally with a tubular molded plastic desiccant bed insert 26 which cooperates with the circumferentially extending wall 20 to define a circumferentially extending annular desiccant bed 28. The desiccant bed 28 is filled with a beaded desiccant material, some of which is illustrated at 30. The insert 26 defines a central cavity generally indicated by the numeral 32. The end wall 22 is provided with an axially extending boss 34 which defines a recess 36. End wall 22 is also provided with a one-way check valve 38, which permits substantially uninhibited flow of compressed air out of the desiccant bed 28 and into purge volume 40 which is defined between the desiccant canister 18 and the cover member 16. A perforated pressure plate 42 is slidably mounted within the desiccant bed 28 and a spring 44 between the end plate 22 and the pressures plate 42 maintains pressure on the pressure plate 42 so that desiccant beads 30 are loaded to inhibit relative movement between the desiccant beads. End wall 22 is further provided with a flow restricting orifice 46 which permits restricted flow of compressed air in the purge volume 40 into the desiccant bed 28 whenever the pressure in the desiccant bed 28 drops below the pressure level in the purge volume 40, as occurs when a purge cycle of the air dryer is initiated, as will be hereinafter more fully explained.

The circumferentially extending wall 20 terminates in a radially inwardly projecting portion 48 which is provided with threads 50 which engage corresponding threads on axially extending boss 52 which projects from the base 14. Accordingly, the desiccant canister 16 can be installed and removed on the base 14 by engaging or disengaging the threads 50 with the corresponding threads on the boss 52. The projecting portion 48 supports the lower end wall 24 which is an integral part of the insert 26 and projects radially outwardly from an inner circumferentially extending wall 54 which projects axially from the end wall 24 and defines the cavity 32. Openings 56 permit communication between cavity 32 and desiccant bed 28. Apertures 58 are provided in the end wall 24 to permit communication of air during purging into a bypass passage 60 defined between the base 14 and the canister 18, as will hereinafter be described.

The base 14 includes a supply or inlet port 62, which is communicated to a source of air pressure, such as the vehicle air compressor, and a delivery port 64, which communicates purge volume 40 with storage reservoirs (not shown) through a one way check valve 66 which permits communication out of the purge volume 40, but prevents communication in the reverse direction. Base 14 further includes a control port 68, which is communicated to a pressure control signal generated by a conventional compressor unloader (not shown) when the compressor goes off load. A purge control valve 70 is slidably mounted within the base 14 and includes an exhaust valve portion 72 which cooperates with exhaust valve seat 74 to control communication between a passage 76 with base 14 and atmosphere. Purge control valve 70 further includes an inlet valve portion 78 which cooperates with valve seat 80 to control communication between supply or inlet port 62 and the passage 76. Purge control valve 70 further includes a control surface 81 which is exposed to the pressure level of control port 68 to move from a first position illustrated in the drawing in which the exhaust port 74 is closed and communication is permitted between supply port 62 and the passage 76, to an actuated position in which the valve surface 78 closes against the valve seat 80 to terminate communication between supply port 62 and passage 76 and which simultaneously opens the exhaust port 74 to vent the passage 76 to atmosphere.

The purge valve 70 is housed within a removable module generally indicated by the numeral 82 which is retained within the base 14 by a retaining member 84 which is secured to the base 14 by fasteners 86. The module 82 includes an axially projecting portion 88 that projects into the central cavity 32 of desiccant canister 18. The projecting portion 88 terminates in a radially extending surface 90 from which an axially extending extension 92 projects. The extension 92 is received with one end of a conventional tubular oil filter 94, and the end of the oil filter 94 is supported on the radially extending surface 90. The opposite end of the oil filter 94 is received within the recess 36 of the end wall 22 such that the oil filter 94 is supported centrally within the cavity 32. The oil filter 94 is available commercially from Finite Coalescing Filters, Parker Hannifin Corp. as Model No. EWR-1350. A portion 96 of the passage 76 extends through the extension 92, thereby communicating the passage 76 to the volume defined within the tubular oil filter 94. A check valve 98 permits communication from the bypass passage 60 into the passage 76, but prevents communication in the reverse direction.

In operation, compressed air generated by the aforementioned air compressor enters supply or inlet port 62 and flows past the valve seat 80 and into the passage 76. Accordingly, compressed air is received within the volume defined within the tubular oil filter 94, and travels through the filter (inside to outside), thereby removing the oil content of the compressed air which is retained in the tubular oil filter 94. The compressed air is then received in that portion of cavity 32 defined between the oil filter 94 and the circumferentially extending wall 54. Compressed air then travels through the openings 56 into the desiccant bed 28. The compressed air then travels upwardly, viewing the Figure, through the desiccant bed 28, through the openings in the plate 42, and then into the purge volume 40 through the check valve 38. Because the pressure level in passage 76 is somewhat higher than the pressure in the desiccant bed 28, check valve 98 is closed. Compressed air in purge volume 40 is communicated to the aforementioned reservoirs (not shown) through the check valve 66. Accordingly, a quantity of compressed air will be trapped in the purge volume 40 upstream of the check valve 66 at all times when the air dryer 10 is delivering compressed air to the reservoirs.

The aforementioned conventional unloader is responsive to the pressure level in the reservoirs to generate a control signal unloading the compressor, as is well known to those skilled in the art. This unloading signal generated by the governor is communicated to control port 68 on the air dryer 10. This control signal acts upon the control surface 81, forcing the purge valve 70 downwardly, viewing the Figure, thereby engaging valve surface 78 with valve seat 80 to terminate communication between the supply port 62 and the passage 76. At the same time, the exhaust valve portion 72 of the purge valve 70 is forced away from the exhaust valve seat 74, thereby venting the passage 76 to atmosphere through the exhaust port 74. Accordingly, the volume defined within the tubular oil filter 94 is exhausted to atmosphere. At the same time, the pressure in the desiccant bed 28 is exhausted through the aperture 58, the bypass passage 60 and the check valve 98 into the passage 76 to communicate with exhaust port 74. Accordingly, the pressure in the desiccant bed exhausts directly to atmosphere bypassing round the oil filter 94. The high pressure air stored in the purge volume 40 then bleeds through the flow restricting orifice 46 to communicate through the desiccant bed 28 in a manner well known to those skilled in the art to the passage 76 through the bypass passage 60 and check valve 98.

Pressure in the purge volume 40 is communicated through the flow restricting orifice 46 at a controlled rate to thereby gradually purge the desiccant bed 28 of its moisture content.

It has become accepted practice with prior art air dryers that the oil removal device is serviced at the same time that the desiccant is replaced. Accordingly, servicing a prior art air dryer requires that the cover 16 be removed in order to obtain access to the desiccant canister 18. This is sometimes difficult in prior art devices and requires a great deal of time, since the air dryer 10 is often mounted in portions of the vehicle where access to the cover 16 is obstructed. On the other hand, the bottom of the base 14 must be left unobstructed, because of the exhaust port 74. Accordingly, according to the present invention, the module 82, which mounts the oil filter 94, may be removed by removing fasteners 86 and the retaining plate 84. Accordingly, a new oil filter 94 may be installed upon the module 82 and the module 82 reinstalled in the base, without requiring access to the desiccant canister 18. Accordingly, the oil filter 94 will be replaced relatively often, and that the desiccant canister 18 will be replaced infrequently. Accordingly, the module 82 permits easy replacement of the oil filter 94, which is also proven to be a more effective oil removal device than the oil removal devices used in prior art air dryers. Furthermore, the check valve 98 permits air to bypass the oil filter 95 during purging, thereby avoiding damage to the oil filter 94 assuring that the oil will remain captured in the oil filter 94.

I claim:

1. Air dryer for compressed air system comprising a housing having a supply port and a delivery port, said housing defining a flow path between the supply and delivery ports, a desiccant canister in said flow path for removing moisture entrained in said compressed air, an oil filter in said flow path between the supply port and said desiccant canister for removing oil entrained in said compressed air, said housing further including a control port, a purge port, and a purge valve responsive to the fluid pressure level at the control port to close said supply port and to communicate said flow path to said purge port for causing backflow of air through said flow path through said desiccant canister to said purge port during purging of the canister, said flow path including a bypass passage bypassing said oil filter, and a check valve in said bypass passage preventing communication through the bypass passage when compressed air flows from said supply port to the delivery port but permitting communication through said bypass passage during purging of the desiccant.

2. Air dryer as claimed in claim 1, wherein said oil filter is a tubular member, and said flow path extends from the inside to the outside of said tubular member when flow of air through said flow path is from the supply port to the delivery port.

3. Air dryer as claimed in claim 2, wherein said canister defines an annular compartment enclosing desiccant material and defining a central cavity, said oil filter being mounted within said central cavity.

4. Air dryer as claimed in claim 3, wherein said housing includes mounting means mounting said oil filter in said housing but permitting removal of said oil filter from said housing without first removing the desiccant canister.

5. Air dryer as claimed in claim 4, wherein said mounting means includes a removable module carried by said housing, and releasable retaining means securing said module to said housing but releasable to permit removal of the module with the oil filter upon release of the retaining means, said module including supporting means supporting said oil filter in said compartment.

6. Air dryer as claimed in claim 5, wherein said module includes a boss supporting said oil filter on said module.

7. Air dryer as claimed in claim 1, wherein said canister defines an annular compartment enclosing desiccant material and defining a central cavity, said oil filter being a tubular member mounted within said central cavity.

8. Air dryer as claimed in claim 7, wherein said housing includes a removable module and releasable retaining means securing said module to said housing but releasable to permit removal of the module from the housing upon release of the retaining means, said module including supporting means supporting said oil filter in said compartment, but permitting removal of said oil filter from said compartment with said module.

9. Air dryer as claimed in claim 8, wherein said module also carries said purge valve.

10. Air dryer for compressed air system comprising a housing having a supply port and a delivery port, said housing defining a flow path between the supply and delivery ports, a desiccant canister in said flow path for removing moisture entrained in said compressed air, an oil filter in said flow path between the supply port and said desiccant canister for removing oil entrained in said compressed air, said housing further including a control port, a purge port, and a purge valve responsive to the fluid pressure level at the control port to close said supply port and to communicate said flow path to said purge port for causing backflow of air through said flow path through said desiccant canister to said purge port during purging of the canister, and mounting means mounting said oil filter in said housing but permitting removal of said oil filter from said housing without first removing the desiccant canister.

11. Air dryer as claimed in claim 10, wherein said mounting means includes a removable module carried by said housing, and releasable retaining means securing said module to said housing but releasable to permit removal of the module with the oil filter upon release of the retaining means, said module including supporting means supporting said oil filter in said compartment.

12. Air dryer as claimed in claim 11, wherein said module includes a boss supporting said oil filter on said module.

13. Air dryer as claimed in claim 12, wherein said module also carries said purge valve.

14. Air dryer for compressed air system comprising a housing having a supply port and a delivery port, said housing defining a flow path between the supply and delivery ports, a desiccant canister in said flow path for removing moisture entrained in said compressed air, an oil filter in said flow path between the supply port and said desiccant canister for removing oil entrained in said compressed air, said housing further including a control port, a purge port, and a purge valve responsive to the fluid pressure level at the control port to close said supply port and to communicate said flow path to said purge port for causing backflow of air through said flow path through said desiccant canister to said purge port during purging of the canister, said canister defining an annular compartment enclosing desiccant material and defining a central cavity, said oil filter being a tubular member mounted within said central cavity.

15. Air dryer as claimed in claim 14, wherein said flow path extends from the inside to the outside of said tubular member when flow of air through said flow path is from the supply port to the delivery port.

16. Air dryer as claimed in claim 3, wherein said housing includes mounting means mounting said oil filter in said housing but permitting removal of said oil filter from said housing without first removing the desiccant canister.

17. Air dryer as claimed in claim 14, wherein said housing includes a removable module and releasable retaining means securing said module to said housing but releasable to permit removal of the module from the housing upon release of the retaining means, said module including supporting means supporting said oil filter in said compartment, but permitting removal of said oil filter from said compartment with said module.

18. Air dryer as claimed in claim 17, wherein said module also carries said purge valve.

* * * * *